United States Patent
Gernhardt et al.

(10) Patent No.: US 11,860,896 B2
(45) Date of Patent: *Jan. 2, 2024

(54) DATA OBJECT REPLICATION USING A REPLICATION SEQUENCE

(71) Applicant: Snowflake Inc., Bozeman, MT (US)

(72) Inventors: Robert Bengt Benedikt Gernhardt, Seattle, WA (US); Chao-Yang Lo, Redmond, WA (US); Nithin Mahesh, Redmond, WA (US); Subramanian Muralidhar, Mercer Island, WA (US); Sahaj Saini, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,869

(22) Filed: Sep. 27, 2022

(65) Prior Publication Data
US 2023/0185825 A1 Jun. 15, 2023

Related U.S. Application Data

(63) Continuation of application No. 17/643,646, filed on Dec. 10, 2021, now Pat. No. 11,494,411.

(51) Int. Cl.
| | | |
|---|---|---|
| *G06F 16/00* | (2019.01) | |
| *G06F 16/27* | (2019.01) | |
| *G06F 16/185* | (2019.01) | |
| *G06F 16/11* | (2019.01) | |
| *G06F 16/13* | (2019.01) | |

(52) U.S. Cl.
CPC ........... *G06F 16/273* (2019.01); *G06F 16/11* (2019.01); *G06F 16/13* (2019.01); *G06F 16/185* (2019.01)

(58) Field of Classification Search
CPC ...... G06F 16/273; G06F 16/185; G06F 16/22; G06F 16/11; G06F 16/13
USPC .......................................................... 707/613
See application file for complete search history.

(56) References Cited

U.S. PATENT DOCUMENTS

| | | | | |
|---|---|---|---|---|
| 10,628,380 | B2* | 4/2020 | Yadav | G06F 16/13 |
| 10,977,219 | B2* | 4/2021 | Beckmann | G06F 16/22 |
| 2017/0315882 | A1* | 11/2017 | Yammine | G06F 16/11 |
| 2021/0165768 | A1 | 6/2021 | D'Halluin et al. | |

OTHER PUBLICATIONS

"U.S. Appl. No. 17/643,646, Non Final Office Action dated Mar. 15, 2022", 15 pgs.

(Continued)

*Primary Examiner* — Chelcie L Daye
(74) *Attorney, Agent, or Firm* — Schwegman Lundberg & Woessner, P.A.

(57) ABSTRACT

A system for data object replication includes at least one hardware processor and at least one memory storing instructions. The instructions cause the at least one hardware processor to perform operations including decoding a replication request to obtain a data object. Object dependencies associated with the data object and a plurality of additional data objects are determined. A replication sequence of the data object and the plurality of additional data objects is determined based on the object dependencies. A replication of the data object and at least one of the plurality of additional data objects is performed according to the replication sequence. A notification of a successful completion of the replication is generated.

30 Claims, 11 Drawing Sheets

(56) References Cited

OTHER PUBLICATIONS

"U.S. Appl. No. 17/643,646, Notice of Allowance dated Jul. 20, 2022", 8 pgs.

"U.S. Appl. No. 17/643,646, Response filed Jun. 15, 2022 to Non Final Office Action dated Mar. 15, 2022", 23 pgs.

\* cited by examiner

DATA OBJECT REPLICATION USING A REPLICATION SEQUENCE

PRIORITY CLAIM

This application is a Continuation of U.S. patent application Ser. No. 17/643,646, filed Dec. 10, 2021, the content of which is hereby incorporated by reference in its entirety.

TECHNICAL FIELD

Embodiments of the disclosure relate generally to databases and, more specifically, to replication of account object metadata in a network-based database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
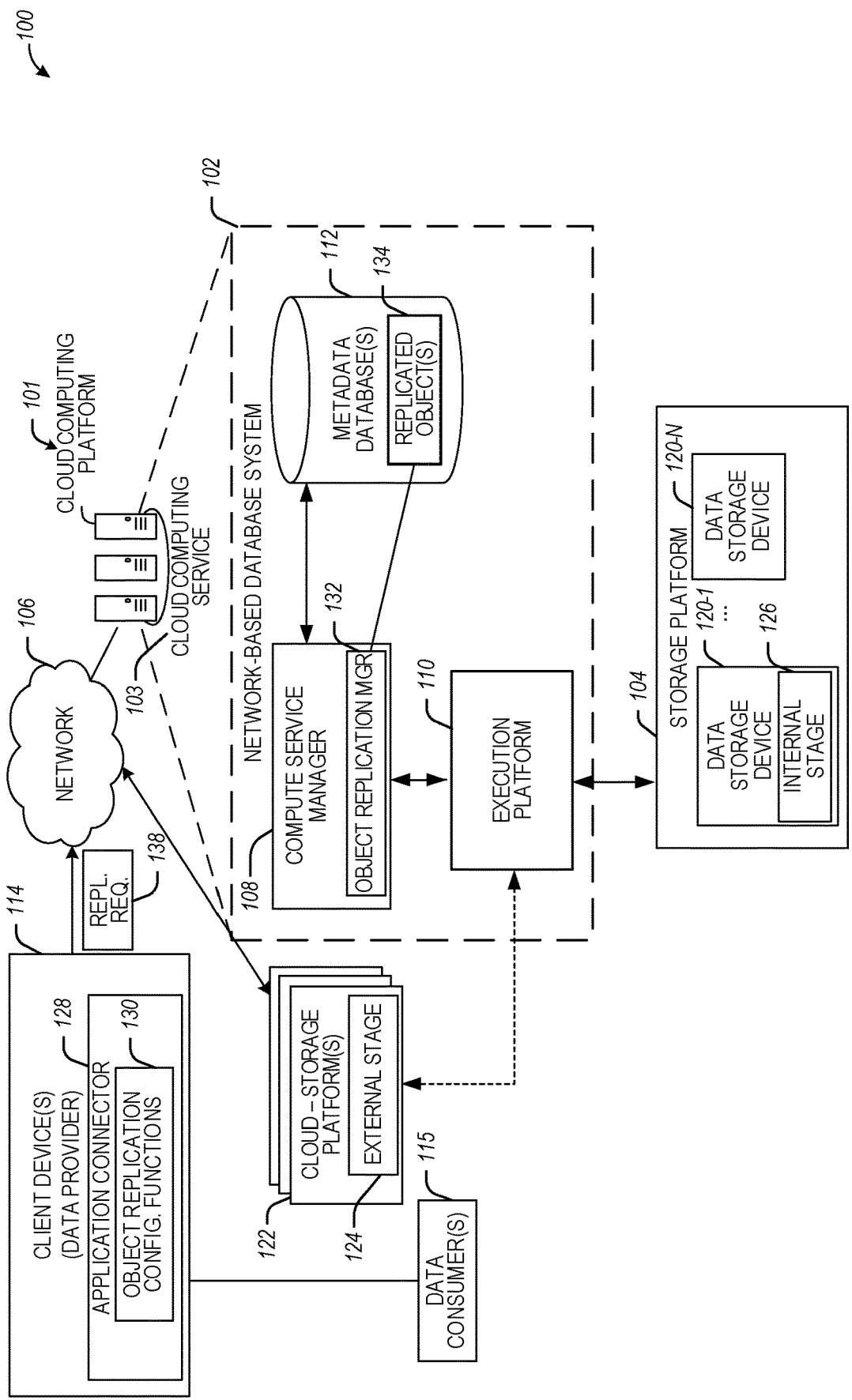
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a data platform, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

Existing account object metadata synchronization techniques between different customer accounts include manual maintenance of different database-related processes to ensure the different account objects are synchronized in all accounts. Such synchronization techniques may be costly and time-consuming as the data provider has to execute multiple show or information schema queries, and then execute commands on the secondary (or target) account to ensure the account object metadata in the secondary account is synchronized with the account object metadata in the primary (or source) account. In this regard, account object metadata synchronization techniques based on replicating only a single database object (e.g., schemas, tables, columns, sequences, and functions underneath a database object) and manually synchronizing the object processes between accounts is associated with inefficiencies. Additionally, if an object in a first database that is being replicated refers to an object in a second database, then a refresh of the first database would fail. If databases are replicated separately, such databases may not be transactionally consistent with each other as each database will be replicated in a certain time difference between databases. In this regard, a replicated account object can be associated with other dependencies (e.g., one or more other account objects), which would also need to be synchronized if the account object is replicated.

Aspects of the present disclosure provide techniques for configuration and use of account object metadata replication. More specifically, a replication request (e.g., from a data provider) indicates at least a first account object (e.g., a user account object) as well as a source account (e.g., an account of a data provider) and target accounts (e.g., an account of the data provider or a customer of the data provider such as a data consumer). An object dependency of the at least first account object to at least a second account object is determined. A replication of the at least first and second account objects is performed from the source account to the target account. In this regard, multiple account objects can be replicated based on a single replication request, which allows for the ability to replicate multiple objects (including databases) with point-in-time consistency transactionally. Additional benefits of using account object metadata replication include simplicity in data management, ability to have related objects across different databases (e.g., across different remote deployment accounts of a data provider), ability to replicate account metadata along with data, transactional consistency during replication across multiple databases, and simplified management of replication refreshes.

Even though the replication request is described as including at least a first account object, a source account, and target account, the disclosure is not limited in this regard and the replication request can be configured to include other configurations. Additionally, the configurations that are described herein as included in the replication request may be stored in a metadata database and retrieved prior to replication (e.g., based on user-specific identifier in the replication request for a user requesting the replication, or based on other account/device/user identifying information included in the replication request).

The various embodiments that are described herein are described with reference where appropriate to one or more of the various figures. An example computing environment with an application connector (e.g., as installed at a client device) configured to perform object replication configuration functions, as well as a compute service manager with an object replication manager (e.g., configured to perform the disclosed account object replication functionalities) are discussed in connection with FIGS. 1-3. An example object replication manager is discussed in connection with FIG. 4. Additional account object replication configurations are discussed in connection with FIG. 5-FIG. 10. A more detailed discussion of example computing devices that may be used with the disclosed techniques is provided in connection with FIG. 11.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., configuring replication group objects as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, the client device 114 is configured with an application connector 128, which may be configured to perform object replication configuration functions 130. For example, client device 114 can be associated with a data provider using the cloud computing service 103 of the network-based database system 102. In some embodiments, object replication configuration functions 130 include generating a replication request 138 for communication to the network-based database system 102 via the network 106. For example, replication request 138 can be communicated to the object replication manager 132 of the compute service manager 108. The object replication manager 132 is configured to perform replication of one or more account objects and generate replicated objects 134 based on the replication request 138.

In some embodiments, the replication request indicates at least a first account object for replication. The indicated at least first account object can be used to determine dependency to at least a second account object. In some aspects, the at least first and second account objects can be associated with a corresponding account object type of a plurality of account object types. In some aspects, the plurality of account object types comprises at least one of the following: a user account object type, a roles account object type, a grant account object type, a warehouse object type, a resource monitor object type, a database account object type, a share account object type, an integration account object type, and network policy account object type. In some aspects, the replication request can be configured to further indicate a source account and a target account for performing the account object replication (e.g., from the source account into the target account). A more detailed description of the account object types is provided in connection with FIG. 4.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata (e.g., account objects used in connection with a replication group object). Additionally, the metadata database 112 can also store the replicated account objects 134. In some embodiments, the replicated account objects 134 can be stored in storage platform 104 or cloud-storage platforms 122.

Figure 3:
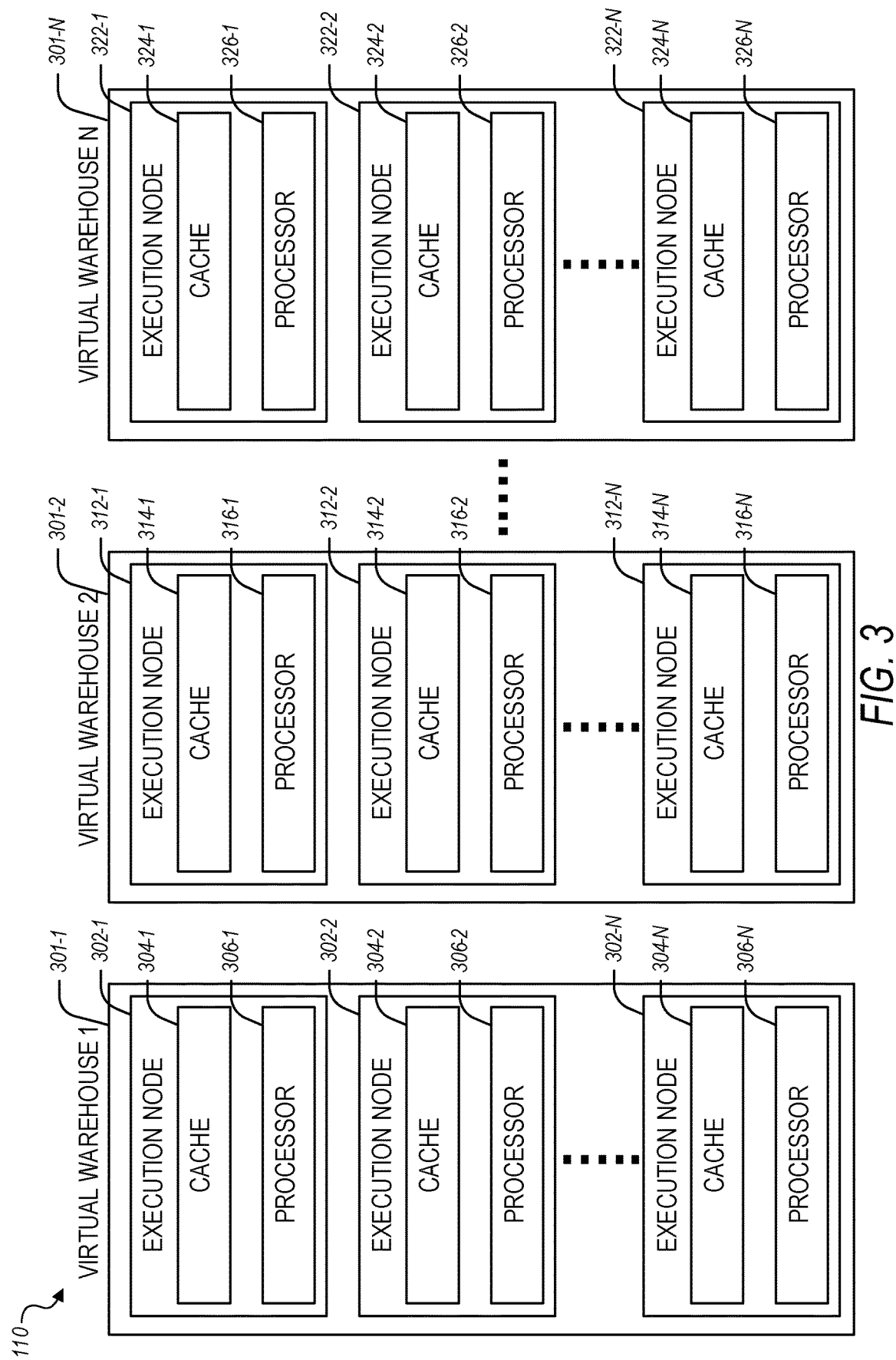
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, the compute service manager 108 includes the object replication manager 132. The object replication manager 132 comprises suitable circuitry, interfaces, logic, and/or code and is configured to perform the disclosed functionalities associated with configuration and use of account object metadata replication. For example, the object replication manager 132 performs account object replication to generate replicated objects 134 based on the replication request 138. More specifically, the object replication manager 132 is also configured to perform a replication of the plurality of account objects from a source account of the data provider into at least one target account based on configuration information in the replication request 138. Additional functionalities associated with the configuration of account object replication are discussed in connection with FIG. 4-FIG. 11.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
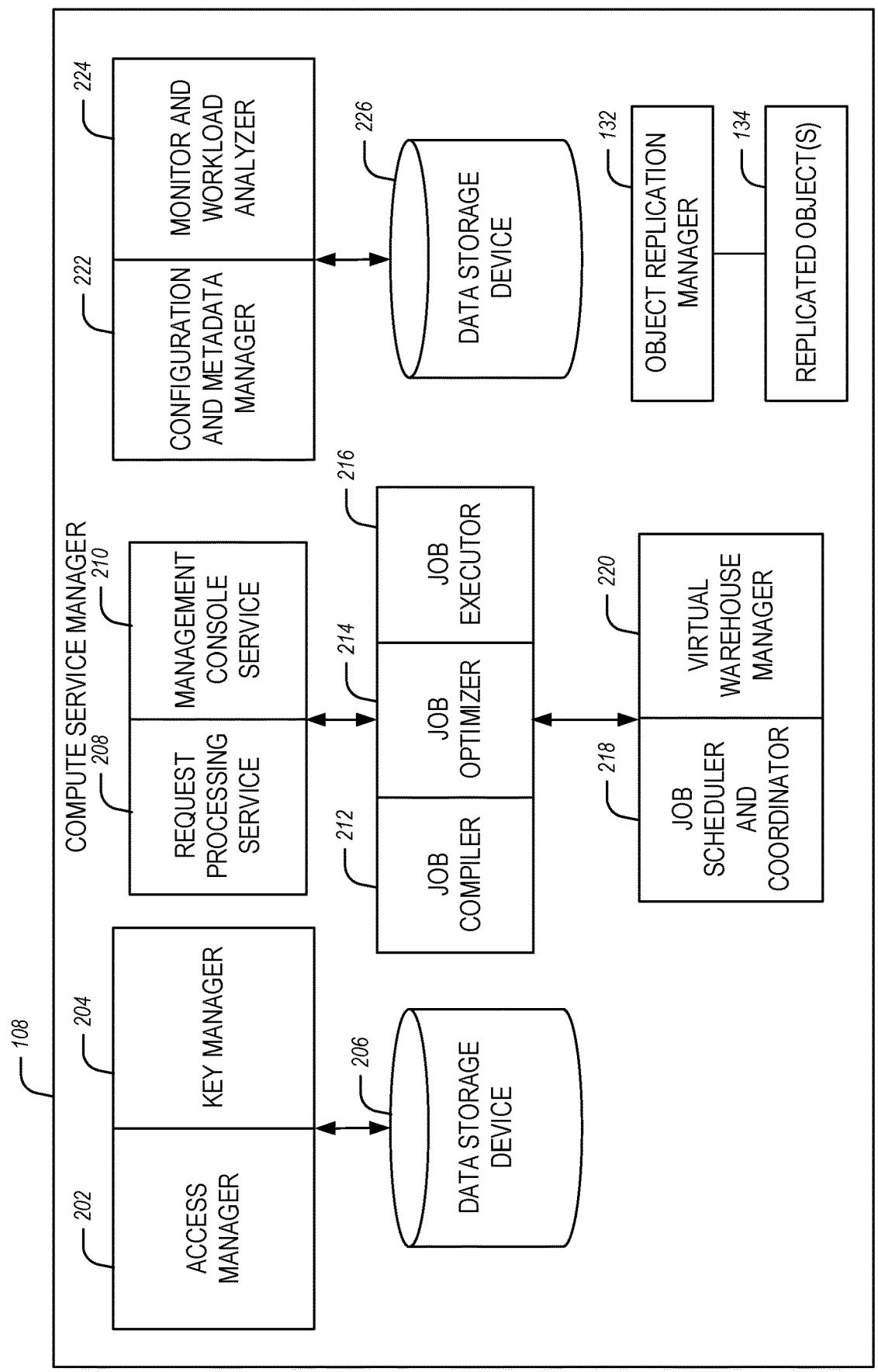
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the object replication manager 132 configured to perform the disclosed functionalities associated with configuration and use of account object replication. For example, the object replication manager 132 generates replicated objects 134 based on the replication request 138.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, at least one of the execution nodes of execution platform 110 (e.g., execution node 302-1) can be configured with the replication group manager 132.

Some example embodiments involve provisioning a remote account of a data provider—a type of account that is referred to herein at times as a "remote-deployment account," a "remote-deployment account of a data provider," a "data-provider remote account," and the like—with one or more replication group objects for purposes of performing replication from a source account into a target account.

It is also noted here that the terms "replication" and "refresh" (and similar forms such as "replicating," "refreshing," etc.) are used throughout the present disclosure. Generally speaking, "refresh" and its various forms are used to refer to a command or instruction that causes a database to start receiving one-way syncing (e.g., "pushed" updates). The term "replicate" and its various forms are used in a few different ways. In some cases, the "replicate" terms are used as a precursor to the "refresh" terms, where the "replicate" terms refer to the preparatory provisioning (populating, storing, etc.) of account objects, in some cases along with one or task objects as described herein. When used in that manner, the "replicate" terms can be analogized to putting up scaffolding for a building, and the "refresh" terms can be analogized to putting up the building.

The "replicate" terms are also used in another way herein—in those cases, the terms are used as a general label for what a data consumer may request (e.g., via their data provider) when the data consumer wishes to have made available to them a local instance of a given database at a given remote-deployment account of their data provider. That is, the data consumer may request "replication" of a given database to a given remote deployment, and a data platform may responsively perform operations such as the more technical "replicate" operations (putting up the scaffolding) using one or more replication group objects and "refresh" operations (building, populating, filling in, etc.) that are also described herein.

Figure 4:
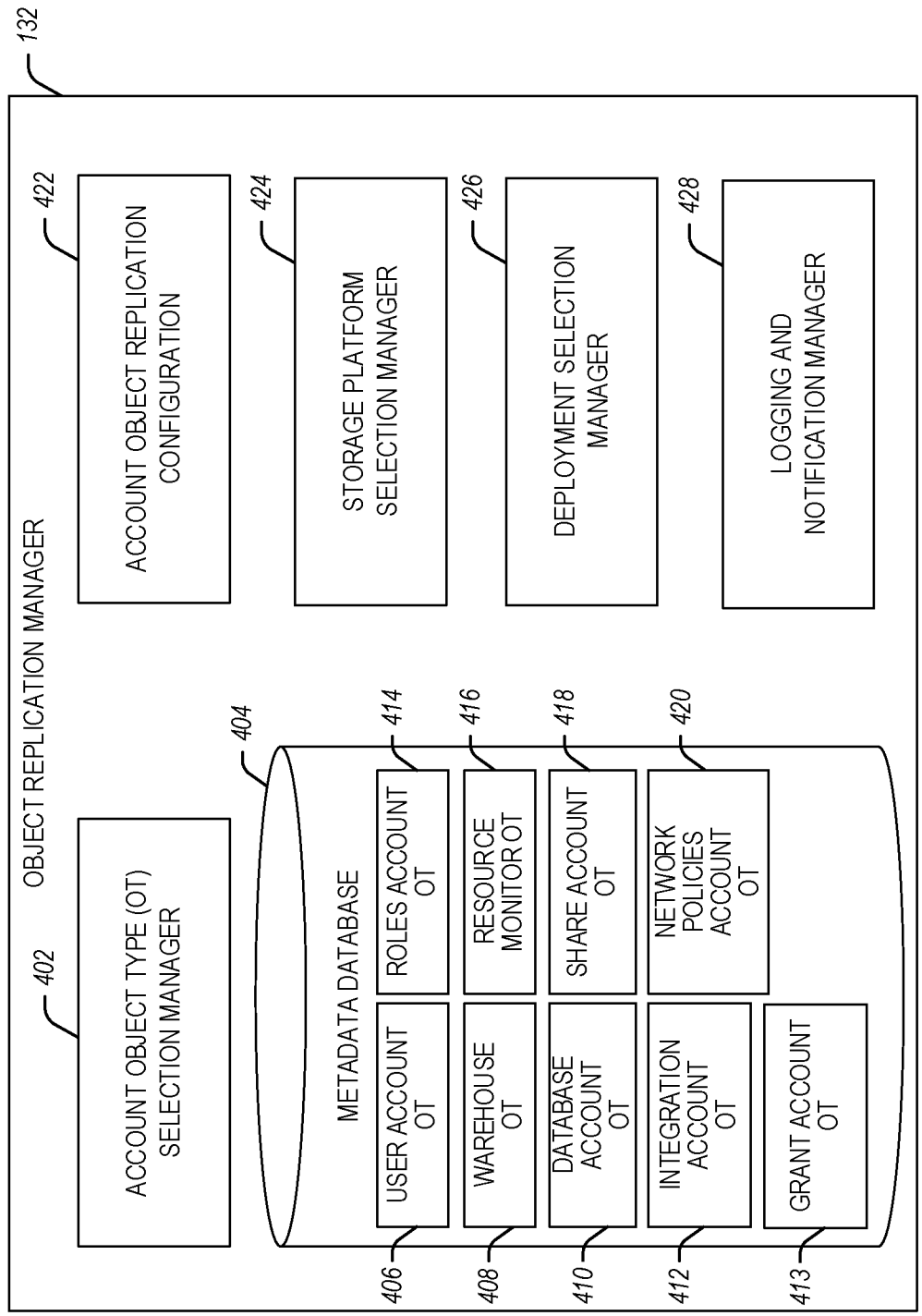
FIG. 4 is a block diagram of an object replication manager used in the network-based database system of FIG. 1, in accordance with some embodiments of the present disclosure.

FIG. 4 is a block diagram of an object replication manager 132 used in the network-based database system of FIG. 1, in accordance with some embodiments of the present disclosure. Referring to FIG. 4, the object replication manager 132 includes an account object type (OT) selection manager 402, metadata database 404, account object replication configuration 422, a storage platform selection manager 424, a deployment selection manager 426, and logging and notification manager 428.

Figure 6:
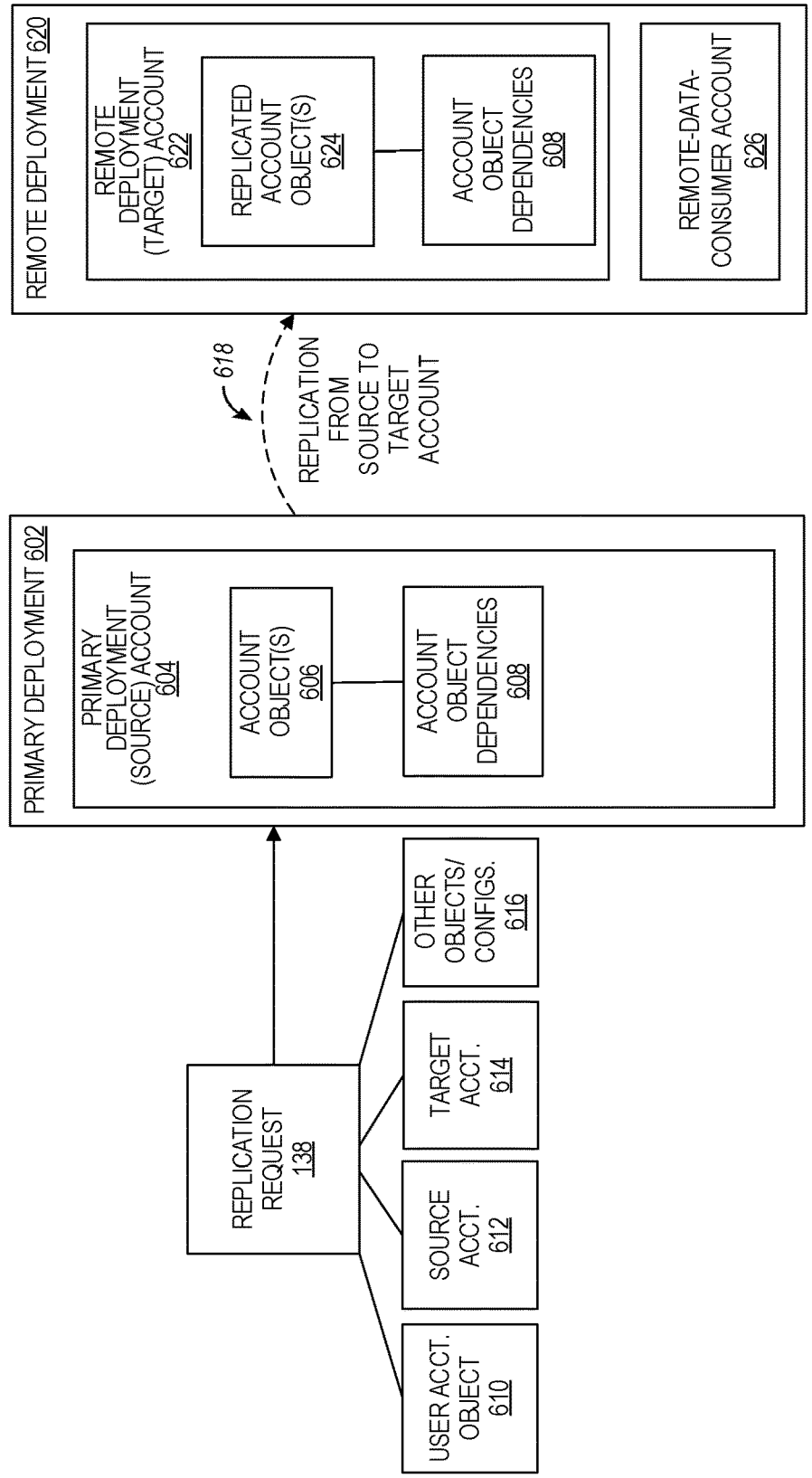
FIG. 6 illustrates an example multi-deployment arrangement using account object replication from a source account into a target account, in accordance with some embodiments of the present disclosure.

The account object replication configuration 422 includes configurations for performing account object metadata replication. For example, the account object replication configuration 422 includes one or more configurations communicated from a client device via the replication request 138. Configurations communicated via the replication request 138 (which are also illustrated in FIG. 6) include a user account object for replication, a source account, a target account, as well as one or more additional objects or other configurations.

Figure 5:
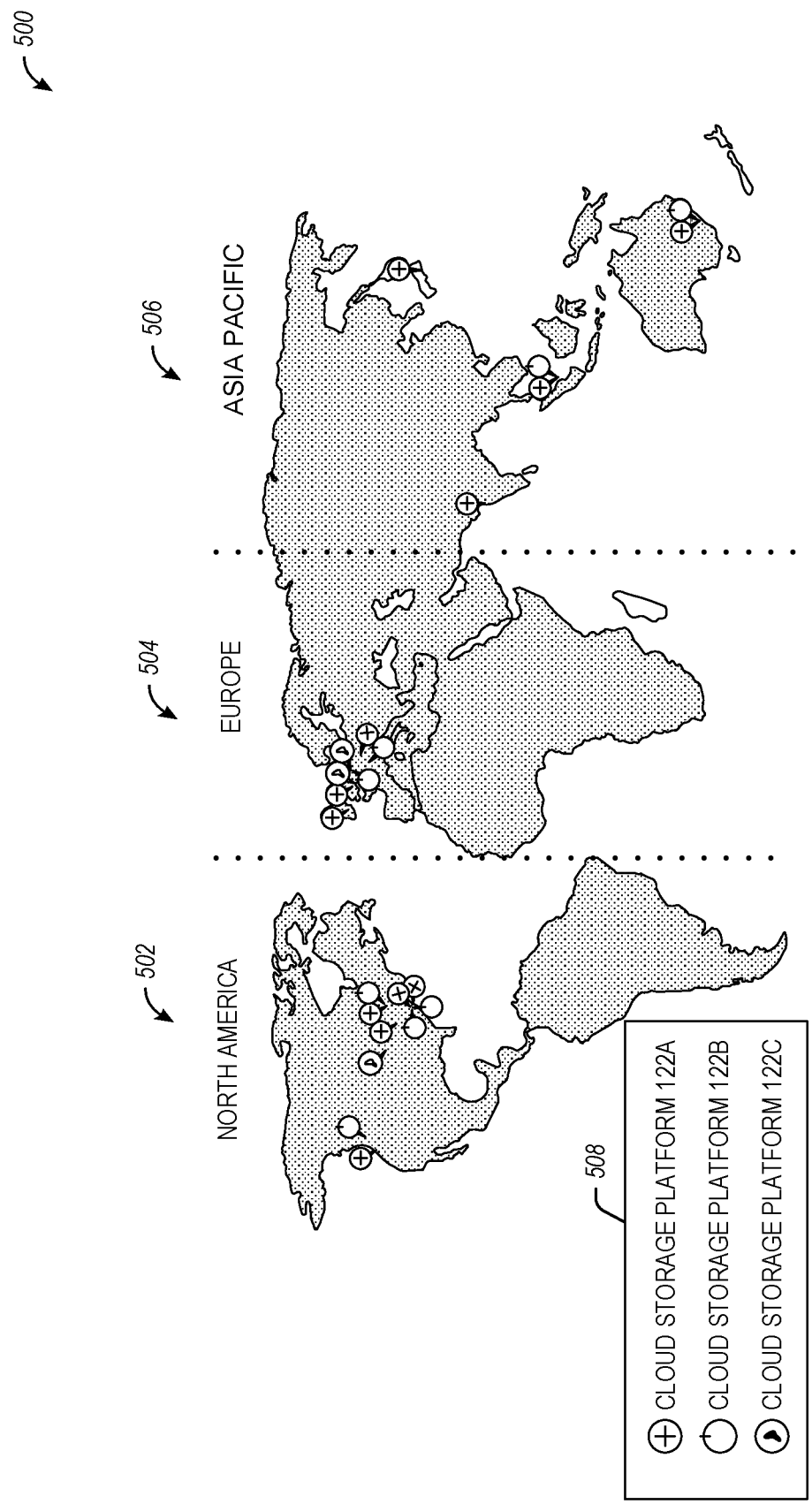
FIG. 5 illustrates an example regional-deployment map for the example database system of FIG. 1, in accordance with some embodiments of the present disclosure.

The storage platform selection manager 424 comprises suitable circuitry, interfaces, and/or code and is configured to select a storage platform for storing the replicated account object metadata. The selection of the storage platform can be based on a selection of a target account communicated via the replication request. In some embodiments, the selection of the storage platform is performed based on a deployment selection performed by the deployment selection manager 426. Example cloud storage deployments are illustrated in FIG. 5.

The deployment selection manager 426 comprises suitable circuitry, interfaces, and/or code and is configured to select at least one deployment (e.g., at least one cloud storage deployment) which can be used for storing the replicated account object metadata. In some embodiments, a deployment selection can be provided with the replication request. In other embodiments, a deployment selection can be performed based on an account OT (e.g., one of the account OTs stored by the metadata database 404) and a specific deployment used for storing account object metadata associated with the account OT.

The account OT selection manager 402 comprises suitable circuitry, interfaces, and/or code and is configured to determine an object dependency associated with at least one account object communicated with the replication request. In some embodiments, the object dependency can be determined based on configuration information associated with each account OT stored by the metadata database 404. After the object dependency is determined, the account OT selection manager 402 selects one or more additional account objects (e.g., account objects that are dependent on the account object received with the replication request). The account OT selection manager 402 can then perform replication of the account object received with the replication request as well as the one or more additional account objects determined based on the object dependency. The replication can be performed from a source account (e.g., a source account indicated by the replication request and associated with a first deployment) to at least one target account (e.g., a target account indicated by the replication request or determined based on the object dependency), which target accounts can be associated with at least a second deployment.

The logging and notification manager 428 is configured to log replications of account object metadata as well as to provide notifications of completed replications or error notifications associated with an unfinished replication.

The metadata database 404 includes information (e.g., object formatting, dependencies, and other configurations) on different account object types which can be used by the account OT selection manager 402 for determining dependencies in connection with account object metadata replication. The metadata database 404 includes information for the following account object types: user account OT 406, roles account OT 414, warehouse OT 408, resource monitor OT 416, database account OT 410, share account OT 418, integration account OT 412, network policy account OT 420, and grant account OT 413. In some aspects, the metadata database 404 is the same as the metadata database 112 in FIG. 1.

In some embodiments, a user account object of the user account OT 406 lists users authorized to access the at least one target account (e.g., an account of a data provider or data consumer 115) into which replication is performed. In this regard, a user account object is an object that is backing an identity. In some embodiments, each user with access to the network-based database system 102 can be represented by a user object. A user object stores all of the information about the user, including their login name, password, and defaults (role, virtual warehouse, and namespace).

In some embodiments, a roles account object of the roles account OT 414 configures privileges for the user to access the at least one target account. For example, a certain role is given access to a certain number of objects or operations (e.g., a role has a certain number of privileges), and a user can be assigned a role. In some aspects, a role can be considered as a user group. Additionally, access to an object can be granted to a role (and not directly to a user), and roles can be granted to users. In some aspects, roles can also be assigned to other roles, creating a role hierarchy. In some embodiments, roles are assigned to users to allow them to perform actions required for business functions in their organization. A user can be assigned multiple roles, which allows users to switch roles (i.e., choose which role is active in a current data processing session) to perform different actions using separate sets of privileges.

In some aspects, the compute service manager 108 uses roles to control access to objects in the network-based database system 102. In this regard, roles are granted access privileges for objects in the system (e.g., databases, tables, etc.). In some aspects, roles can be granted to users to enable them to create, modify, and use the objects for which the roles have privileges. Roles can be granted to other roles to support defining hierarchical access privileges.

In some aspects, a warehouse object of the warehouse OT 408 indicates compute resources (e.g., at least one virtual warehouse of the execution platform 110) for executing a workload associated with one or more databases of the data provider.

In some embodiments, a resource monitor object of the resource monitor OT 416 configures monitoring the usage of compute resources used for executing a workload. For example, a resource monitor object can be used to monitor the usage of a virtual warehouse, and generate a notification if such usage is above a threshold.

In some aspects, a database account object of the database account OT 410 indicates one or more databases of the data provider.

In some embodiments, a share account object of the share account OT 418 is an object that encapsulates information used for sharing a database. A share may include: (a) privileges that grant access to the database and the schema containing the objects to share; (b) the privileges that grant access to the specific objects in the database; and (c) the consumer accounts with which the database and its objects are shared. Once a database is created (e.g., in a consumer account) from a share, all the shared objects are accessible to users in the consumer account.

In some embodiments, an integration account object (also referred to as an application programming interface (API) integration) of the integration account OT 412 is used to provide an interface between the network-based database system 102 and third-party services. In some aspects, the integration account object stores information about a proxy service (e.g., Hypertext Transfer Protocol Secure, or HTTPS, proxy service), including the following information: (a) the cloud platform provider (e.g., Amazon AWS); (b) the type of proxy service (in aspects when the cloud platform provider offers more than one type of proxy service); (c) the identifier and access credentials for a cloud platform role that has sufficient privileges to use the proxy service (for example, on AWS, the role's ARN (Amazon resource name) serves as the identifier and access credentials; when this cloud user is granted appropriate privileges, this user can be to access resources on the proxy service (an instance of the cloud platform's native HTTPS proxy service, for example, an instance of an Amazon API Gateway)); (d) an API integration object also specifies allowed (and optionally blocked) endpoints and resources on those proxy services.

In some embodiments, the integration account object can also be used for creating a notification integration, a security integration, or a storage integration. Creating a notification integration generates a new notification integration in the account or replaces an existing integration. A notification integration is an object that provides an interface between the network-based database system 102 and a third-party cloud message queuing services.

In some aspects, a security integration is an object that provides an interface between the network-based database system 102 and third-party services. A security integration enables clients that support OAuth to redirect users to an authorization page and generate access tokens (and optionally, refresh tokens) for access to the network-based database system 102.

In some aspects, a storage integration is an object that stores a generated identity and access management (IAM) entity for external cloud storage, along with an optional set of allowed or blocked storage locations. This option allows users to avoid supplying credentials when creating stages or when loading or unloading data.

In some aspects, a network policy object of the network policy account OT 420 provides options for managing network configurations in a network-based database system. A network policy object can be used to restrict access to an account based on the user's IP address. Effectively, a network policy enables creating an IP allowed list, as well as an IP blocked list if desired. In this regard, account-level network policy management can be performed through a web interface or SQL.

In some embodiments, a grant account object of the grant account OT 413 is an object that is used to represent a grant of a privilege on an object to another object. The object on which the privilege is granted can be referred to as a "securable," the object that obtains this privilege on the object can be referred to as a "grantee," and the role performing this operation is called the grantor. In some aspects, the securable can be of any object type (e.g., database, schema, table, role, warehouse, resource monitor, account, etc.). In some aspects, a grantee can be a role or a user, and a grantor can be a role.

FIG. 5 illustrates an example regional-deployment map 500 for the example database system of FIG. 1, in accordance with some embodiments of the present disclosure. The regional-deployment map 500 is presented purely by way of example and not limitation, as different numbers and/or boundaries of regions could be demarcated in different implementations. As can be seen in FIG. 5, the regional-deployment map 500 includes three example geographic regions: North American region 502, European region 504, and Asia Pacific region 506. Moreover, various instances of deployments of the network-based database system 102 are depicted on the regional-deployment map 500. A legend 508 shows symbols used for three different deployments of the network-based database system 102, including deployments that are hosted by the cloud-storage platform 122A, deployments hosted by the cloud-storage platform 122B, and deployments that are hosted by the cloud-storage platform 122C. Cloud-storage platforms 122A, 122B, and 122C can be collectively referred to as cloud-storage platforms 122, which are also illustrated in FIG. 1.

In some embodiments, replication of account object metadata configured based on the disclosed techniques can be used in disaster recovery (DR) and global data sharing use cases associated with source accounts (e.g., accounts of a data provider) and target accounts (e.g., accounts of a data provider or a dealer consumer) located in different deployments.

FIG. 6 illustrates an example multi-deployment arrangement 600 using account object replication from a source account into a target account, in accordance with some embodiments of the present disclosure. The example multi-deployment arrangement 600 includes a primary deployment 602 of the network-based database system 102 and a remote deployment 620 of the network-based database system 102. In an example scenario, a data provider (e.g., the data provider associated with client device 114) has a primary-deployment (source) account 604 at the primary deployment 602, and a remote-deployment (target) account 622 at the remote deployment 620. The remote deployment 620 also includes a remote-data-consumer account 626 that is associated with the data consumer 115. In some embodiments, the primary deployment 602 and the remote deployment 620 may be located in the same or different geographic regions.

In some embodiments, the primary deployment account 604 of the primary deployment 602 can receive a replication request 138 for processing. The replication request 138 can include configuration information for configuring the account object replication, including at least a first user account object 610, source account information 612, target account information 614, and additional configuration information 616. In some embodiments, the at least first user account objects 610 identified for replication in the replication request 138 can be a user account object of the user account OT 406. The source code information 612 and target account information 614 can identify source account 604 and target account 622 respectively. The additional configuration information 616 can identify additional account objects for replication or additional configurations associated with replication of the at least first user account object 610 identified by the replication request 138. Example additional configuration information 616 can include one or more allowed databases associated with the at least first user account object 610 for replication, scheduling information to schedule execution of the replication or to configure periodic replication, or other configuration information.

After receiving the replication request 138, the object replication manager 132 at the primary deployment 602 can determine object dependencies 608 associated with the at least first user account object 610. Based on the object dependencies 608, the object replication manager 132 determines account objects 606 for replication, which includes the at least first user account object 610 as well as additional account objects that have dependencies with the at least first user account object 610. The object replication manager 132 performs replication 618 of account objects 606 into target account 622 at the remote deployment 620, generating replicated account objects 624 associated with same object dependencies 608.

Figure 7:
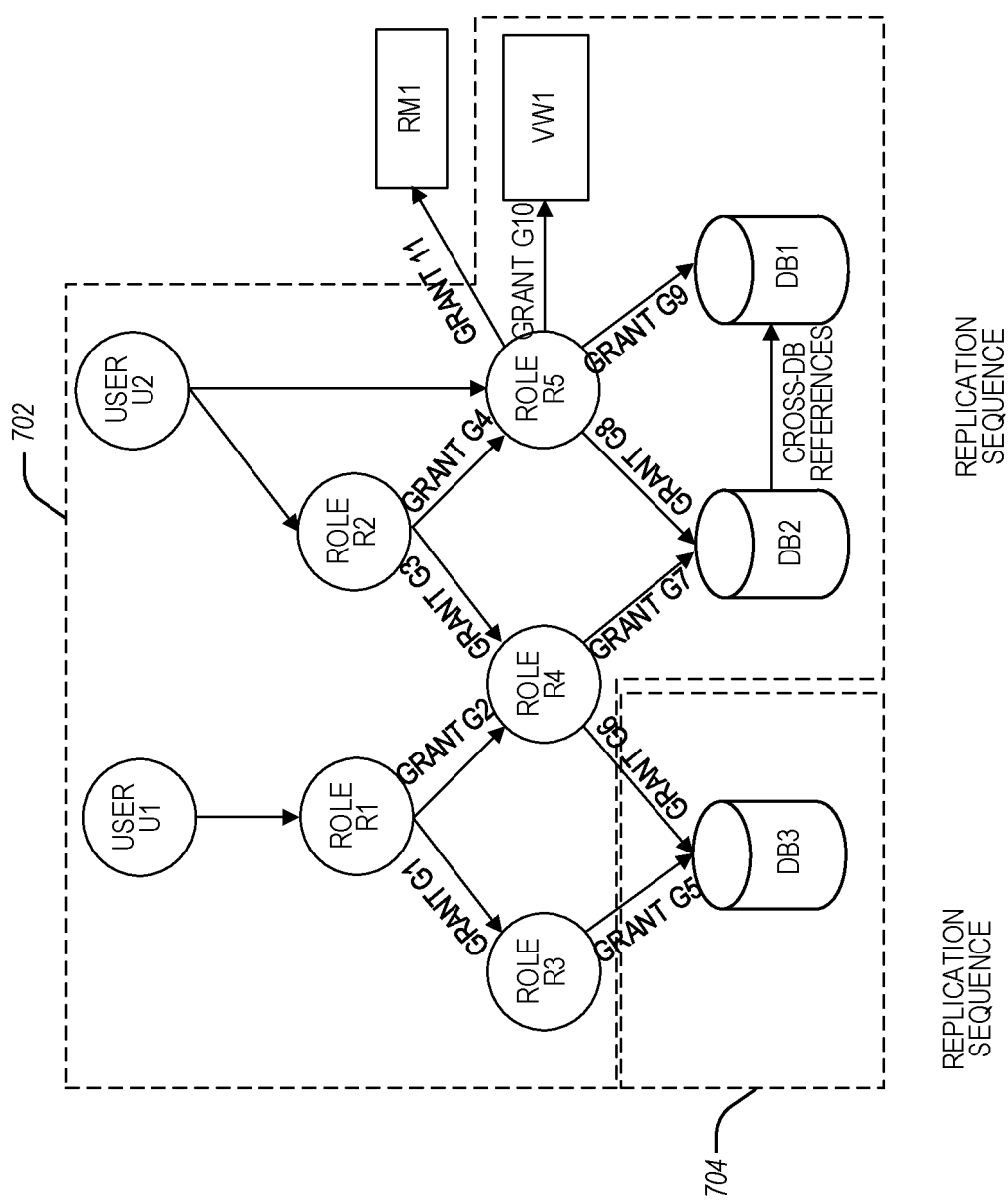
FIG. 7 illustrates example replication sequences of different account objects, in accordance with some embodiments of the present disclosure.

FIG. 7 illustrates diagram 700 of example replication sequences of different account objects, in accordance with some embodiments of the present disclosure. As mentioned above, an account object that can be replicated based on a replication request can include account-entity domains such as users, roles, warehouses, databases, etc., and optionally include/exclude certain account domains, and also specific databases, schemas, and tables. This enables a near-zero knob experience for simple use cases for data providers or data consumers who want to replicate their entire account, and also enables advanced use cases such as filtering out certain databases, schemas, and tables for cost control, or independent replication/failover for databases that belong to different business units of a data provider or a data consumer.

Referring to FIG. 7, the object replication manager 132 can configure multiple replications of account objects, such as the account objects illustrated as replication sequences 702 and 704 in FIG. 7. In this regard, when the account object dependencies are determined for a replication sequence, the account objects (including associated databases) of the replication sequence can be replicated together as dependent/related account objects.

More specifically, the object replication manager 132 can configure replication of the following account object metadata within replication sequence 702: user account objects U1 and U2 associated with corresponding roles account objects R1 and R2; roles account objects R1 and R2 with additional roles account objects R3, R4, and R5; roles R4 and R5 are associated with databases DB1 and DB2 as well as virtual warehouse VW1 via different grants. Since DB1 and DB2 have cross-database references (or database dependencies), both databases can be included in the same account object replication. Roles R1-R5, databases DB1, DB2, and virtual warehouse VW1 are associated with grants G1, G2, G3, G4, G7, G8, G9, and G10 (as illustrated in FIG. 7). In some embodiments, database dependencies can be verified upon a refresh command and a notification can be provided to the client device communicating the replication request.

Similarly, replication sequence 704 includes database DB3 which is associated with roles R3 and R4 via grants G5 and G6, which account objects can also be replicated together.

Figure 8:
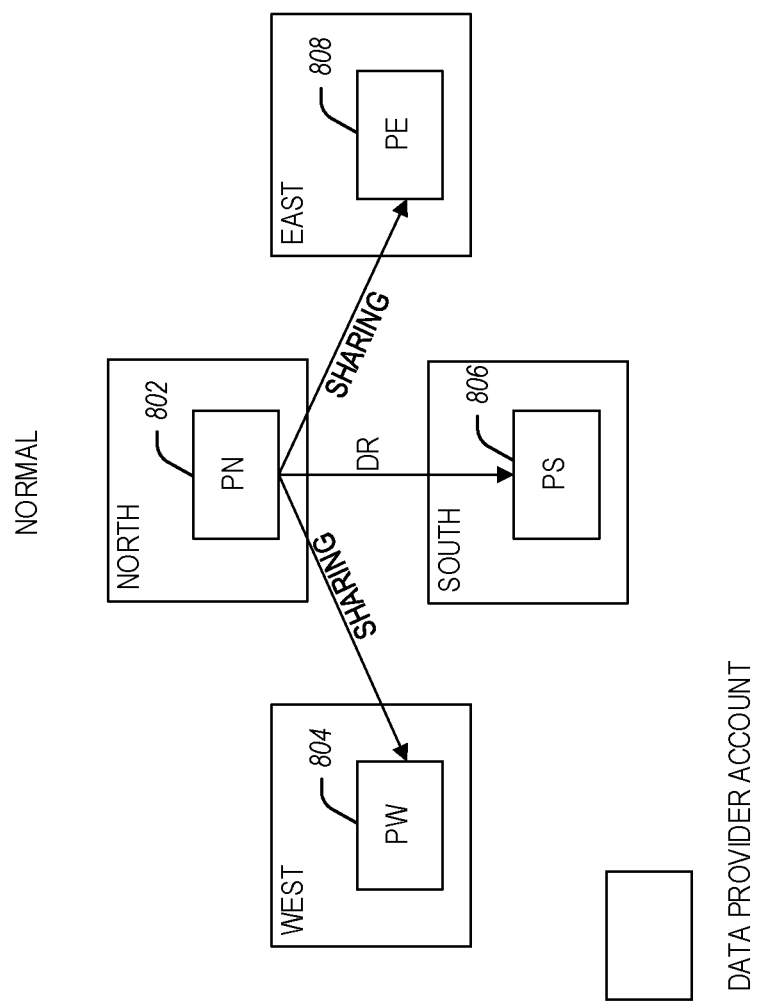
FIG. 8 and FIG. 9 illustrate example usage scenarios for account object metadata replication in connection with disaster recovery (DR) and data sharing, in accordance with some embodiments of the present disclosure.
Figure 9:
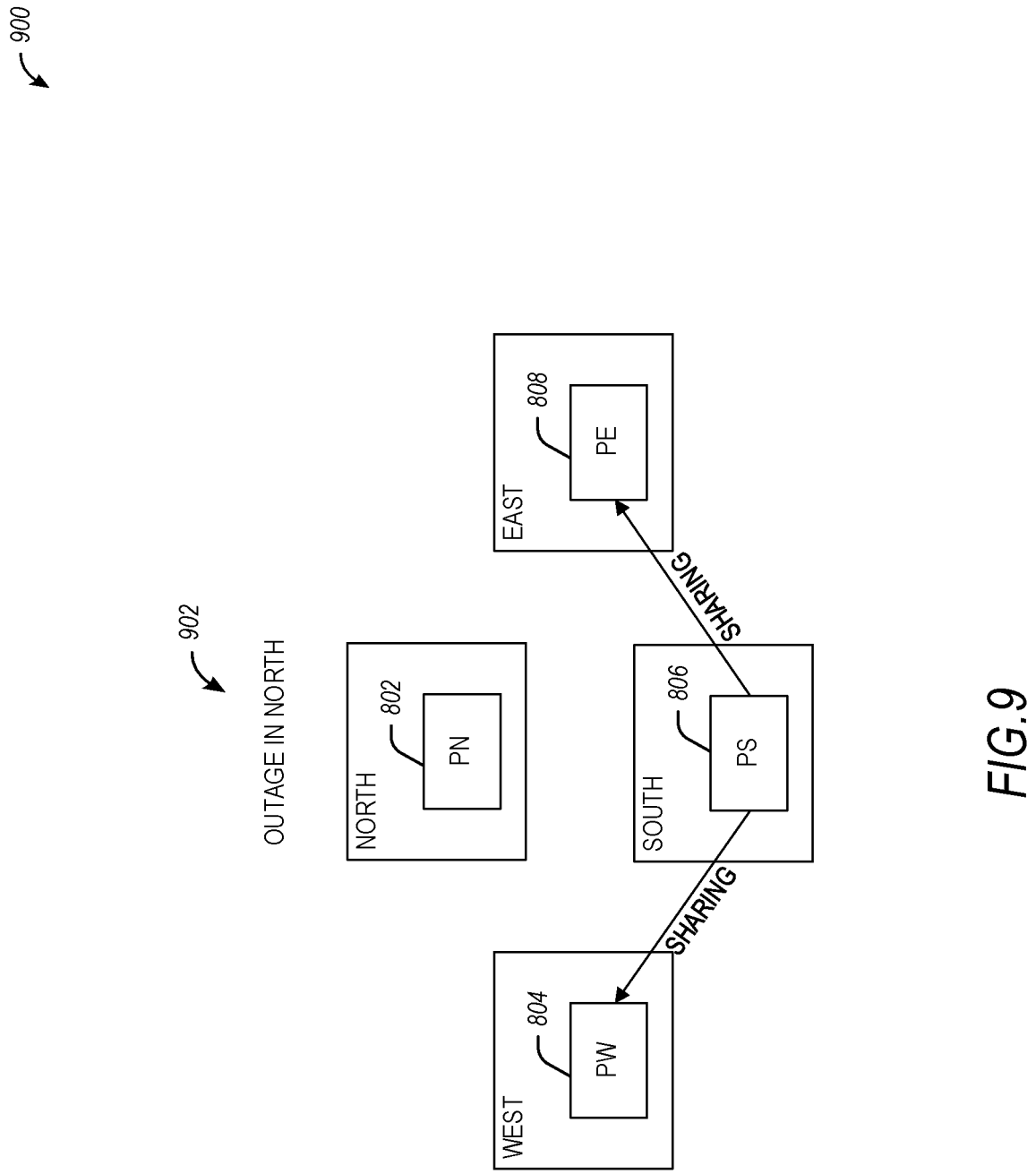

FIG. 8 and FIG. 9 illustrate example usage scenarios for account object metadata replication in connection with disaster recovery (DR) and data sharing, in accordance with some embodiments of the present disclosure. Referring to FIG. 8, use case 800 illustrates replication of account objects (e.g., using disclosed account object metadata replication techniques) from a source (or primary) account 802 of a data provider into other data provider accounts 804, 806, and 808, with all accounts being deployed at different geographic locations. For example, one or more account objects from the source account 802 can be configured and replicated to target account 806 for use as a failover account object during DR. In the event of a detected network failure event, DR can be initiated by promoting the target account 806 to a primary account (an example DR configuration is illustrated in FIG. 9). As illustrated in FIG. 8, account objects replication from the source account 802 to target accounts 804 and 808 is used for global data sharing and generating read replicas of account objects using account object replication.

FIG. 9 illustrates a DR event 900 where network outage is detected in the North location 902 where source account 802 is deployed. Since source account 802 was previously replicated into target account 806, then target account 806 can be promoted to a primary/source account which can initiate account object replication into accounts 804 and 808 for purposes of global data sharing.

In some embodiments, database replication can be used in DR scenarios or for data sharing. For DR, a main (or primary) deployment region can failover to a new deployment region that runs all the workloads of the main region (where the workloads of the main region can be replicated into the new deployment region using account object replication). The new deployment region can be promoted to a primary region, and workloads can be executed from the primary region. For DR, the target account used for object replication from the source account can be allowed for promotion from a secondary to a primary account designation so that it can be used during failover in a DR scenario. For purposes of data sharing, the specified target account is allowed only for a secondary account designation and cannot be used for failover.

Figure 10:
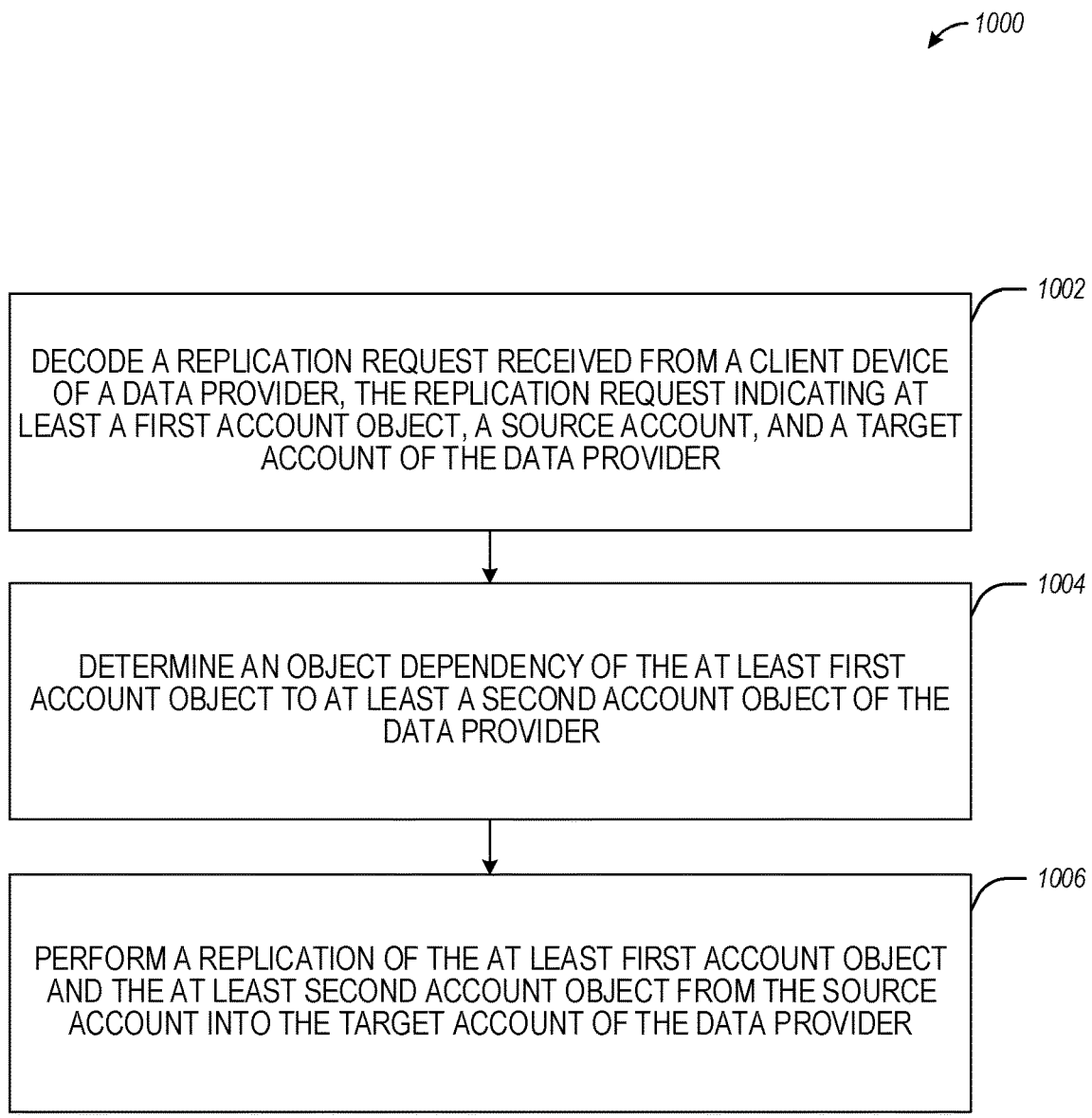
FIG. 10 is a flow diagram illustrating operations of a database system in performing a method for replicating account object metadata, in accordance with some embodiments of the present disclosure.

FIG. 10 is a flow diagram illustrating operations of a database system in performing a method 1000 for replicating account object metadata, in accordance with some embodiments of the present disclosure. Method 1000 may be embodied in computer-readable instructions for execution by one or more hardware components (e.g., one or more processors) such that the operations of the method 1000 may be performed by components of the network-based database system 102, such as a network node (e.g., object replication manager 132 executing on a network node of the compute service manager 108) or computing device (e.g., client device 114) which may be implemented as machine 1100 of FIG. 11 and may be configured with an application connector performing the disclosed functions. Accordingly, method 1000 is described below, by way of example with reference thereto. However, it shall be appreciated that method 1000 may be deployed on various other hardware configurations and is not intended to be limited to deployment within the network-based database system 102.

At operation 1002, a replication request received from a client device of a data provider is decoded. The object replication manager 132 decodes replication request 138, received from client device 114 via network 106. The replication request 138 indicates at least a first account object (e.g., account object 610), a source account (e.g., source account information 612), and a target account (e.g., target account information 614) of the data provider.

At operation 1004, an object dependency of the at least first account object to at least a second account object of the data provider is determined. For example and about FIG. 6, the object replication manager 132 determines account object dependencies 608 associated with the at least first account object indicated by the replication request 138.

At operation 1006, a replication of the at least first account object and the at least second account object is performed from the source account (e.g., source account 604) into the target account (e.g., target account 622) of the data provider.

In some embodiments, the at least first account object and the at least second account object are associated with a corresponding account object type of a plurality of account object types (e.g., one of account object types 406-420). The plurality of account object types comprises at least one of: (a) a user account object type 406 (e.g., a user account object of the user account object type 406 lists a user authorized to access the target account); (b) a roles account object type 414 (e.g., a roles account object of the roles account object type 414 configures privileges for accessing an account object, the privileges associated with a role of the user); (c) a grant account object type 413 (e.g., a grant account object of the grant account object type 413 configures a grant of at least one of the privileges for accessing the account object to at least another object); (d) a warehouse object type 408 (e.g., a warehouse object of the warehouse object type 408 indicates compute resources for executing a workload associated with one or more databases); (e) a resource monitor object type 416 (e.g., a resource monitor object of the resource monitor object type 416 configures monitoring usage of the compute resources); (f) a database account object type 410 (e.g., a database account object of the database account object type 410 indicates the one or more databases); (g) a share account object type 418 (e.g., a share account object of the share account object type 418 configures sharing of the one or more databases from the source account to at least another account of the user); (h) an integration account object type 412 (e.g., an integration account object of the integration account object type 412 configures application programming interfaces (APIs) and allowed network access points for accessing the source account or the target account); and (g) a network policy account object type 420 (e.g., a network policy object of the network policy account object type 420 provides network configurations for accessing the source account and the target account of the user).

In some embodiments, the at least first account object is the user account object. The roles account object is determined as the at least second account object based on the dependency.

In some aspects, the at least second account object further includes the grant account object, and the grant account object further configures a grant of privileges associated with the role.

In some embodiments, the replication is performed based on at least one secure credential (e.g., a user password) associated with the user account object.

In some aspects, the replication request further includes the database account object and a list of at least one allowed database, the at least one allowed database being a subset of the one or more databases. The at least second account object is configured to include the list of at least one allowed database. A replication of the at least one allowed database is performed from the source account into the target account of the data provider.

In some aspects, the replication request further includes scheduling information. The replication can be performed according to a replication schedule. The replication schedule can be configured based on the scheduling information.

Figure 11:
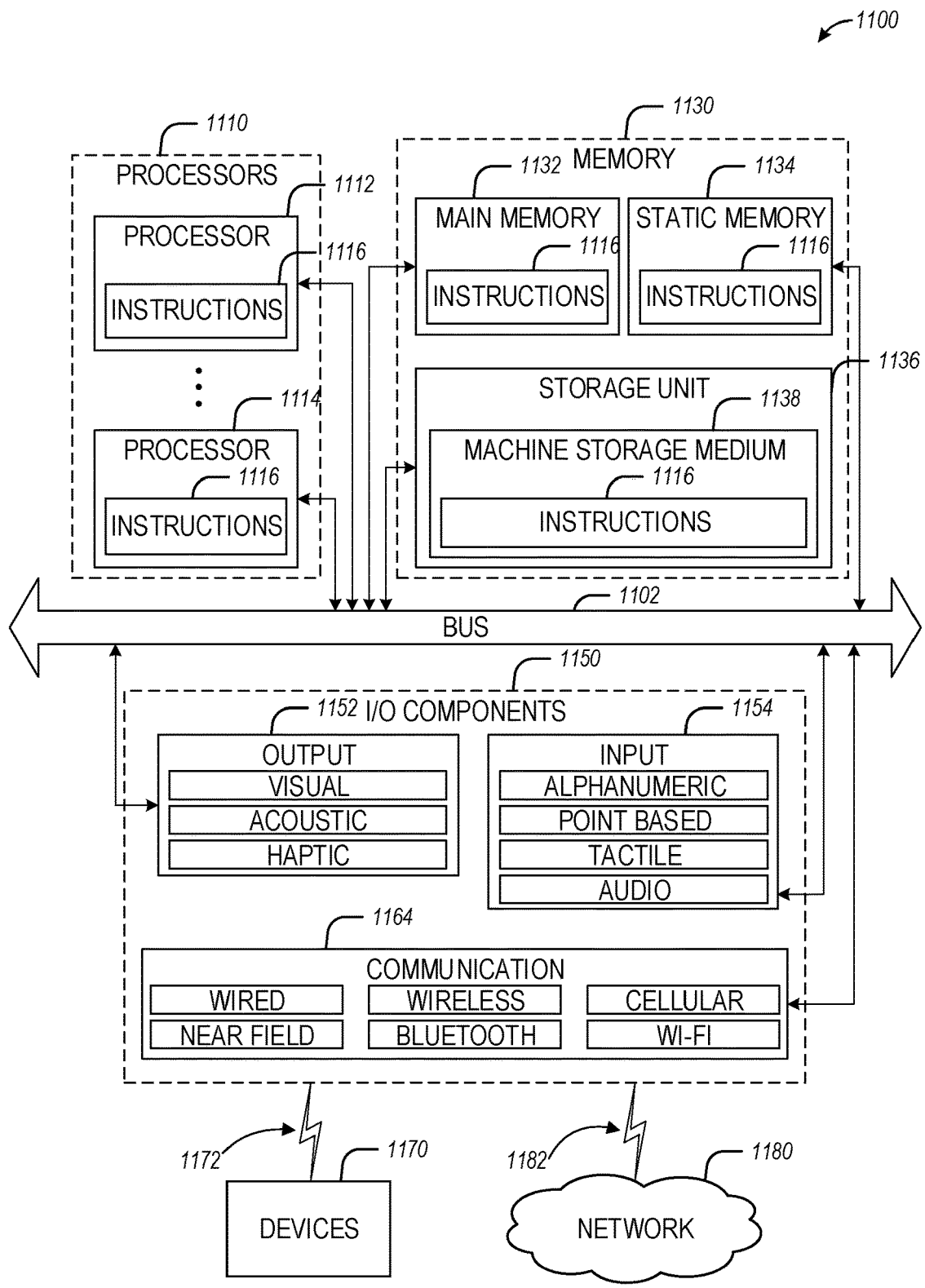
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, instructions 1116 may cause machine 1100 to execute any one or more operations of method 1100 (or any other technique discussed herein, for example in connection with FIG. 4-FIG. 10). As another example, instructions 1116 may cause machine 1100 to implement one or more portions of the functionalities discussed herein. In this way, instructions 1116 may transform a general, non-programmed machine into a particular machine 1100 (e.g., the client device 114, the compute service manager 108, or a node in the execution platform 110) that is specially configured to carry out any one of the described and illustrated functions in the manner described herein. In yet another embodiment, instructions 1116 may configure the client device 114, the compute service manager 108, and/or a node in the execution platform 110 to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

Machine 1100 includes processors 1110, memory 1130, and input/output (I/O) components 1150 configured to communicate with each other such as via a bus 1102. In some example embodiments, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within machine storage medium 1138 of the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The device 1170 may be another machine or any of a wide variety of peripheral devices (e.g., a peripheral device coupled via a universal serial bus (USB)). For example, as noted above, machine 1100 may correspond to any one of the client device 114, the compute service manager 108, or the execution platform 110, and the devices 1170 may include the client device 114 or any other computing device described herein as being in communication with the network-based database system 102 or the cloud storage platform 104.

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of several well-known transfer protocols (e.g., hypertext transfer protocol (HTTP)). Similarly, instructions 1116 may be transmitted or received using a transmission medium via coupling 1172 (e.g., a peer-to-peer coupling or another type of wired or wireless network coupling) to the device 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 1100 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: decoding a replication request received from a client device of a data provider, the replication request indicating at least a first account object, a source account, and a target account of the data provider; determining an object dependency of the at least first account object to at least a second account object of the data provider; and performing replication of the at least first account object and the at least second account object from the source account into the target account of the data provider.

In Example 2, the subject matter of Example 1 includes subject matter where the at least first account object and the at least second account object are associated with a corresponding account object type of a plurality of account object types.

In Example 3, the subject matter of Example 2 includes subject matter where the plurality of account object types comprises at least one of: a user account object type, wherein a user account object of the user account object type lists a user authorized to access the target account; a roles account object type, wherein a roles account object of the roles account object type configures privileges for accessing an account object, the privileges associated with a role of the user; a grant account object type, wherein a grant account object of the grant account object type configures a grant of at least one of the privileges for accessing the account object to at least another object; a warehouse object type, wherein a warehouse object of the warehouse object type indicates compute resources for executing a workload associated with one or more databases; and a resource monitor object type, wherein a resource monitor object of the resource monitor object type configures monitoring usage of the compute resources.

In Example 4, the subject matter of Example 3 includes subject matter where the at least first account object is the user account object, and wherein the instructions further cause the at least one hardware processor to perform operations comprising: determining the roles account object as the at least second account object based on the dependency.

In Example 5, the subject matter of Example 4 includes subject matter where the at least second account object further includes the grant account object, the grant account object further configures a grant of privileges associated with the role.

In Example 6, the subject matter of Examples 4-5 includes subject matter where the instructions further cause the at least one hardware processor to perform operations comprising: performing the replication based on at least one secure credential associated with the user account object.

In Example 7, the subject matter of Examples 3-6 includes subject matter where the plurality of account object types further comprises: a database account object type, and wherein a database account object of the database account object type indicates the one or more databases; a share account object type, wherein a share account object of the share account object type configures sharing of the one or more databases from the source account to at least another account of the user; an integration account object type, wherein an integration account object of the integration account object type configures application programming interfaces (APIs) and allowed network access points for accessing the source account or the target account; and a network policy account object type, wherein a network policy object of the network policy account object type provides network configurations for accessing the source account and the target account of the user.

In Example 8, the subject matter of Example 7 includes subject matter where the replication request further includes the database account object and a list of at least one allowed database, the at least one allowed database being a subset of the one or more databases.

In Example 9, the subject matter of Example 8 includes subject matter where the instructions further cause the at least one hardware processor to perform operations comprising: configuring the at least second account object to include the list of at least one allowed database; and performing a replication of the at least one allowed database from the source account into the target account of the data provider.

In Example 10, the subject matter of Examples 1-9 includes subject matter where the replication request further includes scheduling information, and wherein the instructions further cause the at least one hardware processor to perform operations comprising: performing the replication according to a replication schedule, the replication schedule configured based on the scheduling information.

Example 11 is a method comprising: decoding, by at least one hardware processor, a replication request received from a client device of a data provider, the replication request indicating at least a first account object, a source account, and a target account of the data provider; determining, by the at least one hardware processor, an object dependency of the at least first account object to at least a second account object of the data provider; and performing, by the at least one hardware processor, a replication of the at least first account object and the at least second account object from the source account into the target account of the data provider.

In Example 12, the subject matter of Example 11 includes subject matter where the at least first account object and the at least second account object are associated with a corresponding account object type of a plurality of account object types.

In Example 13, the subject matter of Example 12 includes subject matter where the plurality of account object types comprises at least one of: a user account object type, wherein a user account object of the user account object type lists a user authorized to access the target account; a roles account object type, wherein a roles account object of the roles account object type configures privileges for accessing an account object, the privileges associated with a role of the user; a grant account object type, wherein a grant account object of the grant account object type configures a grant of at least one of the privileges for accessing the account object to at least another object; a warehouse object type, wherein a warehouse object of the warehouse object type indicates compute resources for executing a workload associated with one or more databases; and a resource monitor object type, wherein a resource monitor object of the resource monitor object type configures monitoring usage of the compute resources.

In Example 14, the subject matter of Example 13 includes subject matter where the at least first account object is the user account object, and the method further comprising: determining the roles account object as the at least second account object based on the dependency.

In Example 15, the subject matter of Example 14 includes subject matter where the at least second account object further includes the grant account object, the grant account object further configures a grant of privileges associated with the role.

In Example 16, the subject matter of Examples 14-15 includes, the method further comprising: performing the replication based on at least one secure credential associated with the user account object.

In Example 17, the subject matter of Examples 13-16 includes subject matter where the plurality of account object types further comprises: a database account object type, and wherein a database account object of the database account object type indicates the one or more databases; a share account object type, wherein a share account object of the share account object type configures sharing of the one or more databases from the source account to at least another account of the user; an integration account object type, wherein an integration account object of the integration account object type configures application programming interfaces (APIs) and allowed network access points for accessing the source account or the target account; and a network policy account object type, wherein a network policy object of the network policy account object type provides network configurations for accessing the source account and the target account of the user.

In Example 18, the subject matter of Example 17 includes subject matter where the replication request further includes the database account object and a list of at least one allowed database, the at least one allowed database being a subset of the one or more databases.

In Example 19, the subject matter of Example 18 includes, the method further comprising: configuring the at least second account object to include the list of at least one allowed database; and performing a replication of the at least one allowed database from the source account into the target account of the data provider.

In Example 20, the subject matter of Examples 11-19 includes subject matter where the replication request further includes scheduling information, and the method further comprising: performing the replication according to a replication schedule, the replication schedule configured based on the scheduling information.

Example 21 is a computer-readable medium comprising instructions that, when executed by one or more processors of a machine, configure the machine to perform operations comprising: decoding, by at least one hardware processor, a replication request received from a client device of a data provider, the replication request indicating at least a first account object, a source account, and a target account of the data provider; determining, by the at least one hardware processor, an object dependency of the at least first account object to at least a second account object of the data provider; and performing, by the at least one hardware processor, a replication of the at least first account object and the at least second account object from the source account into the target account of the data provider.

In Example 22, the subject matter of Example 21 includes subject matter where the at least first account object and the at least second account object are associated with a corresponding account object type of a plurality of account object types.

In Example 23, the subject matter of Example 22 includes subject matter where the plurality of account object types comprises at least one of: a user account object type, wherein a user account object of the user account object type lists a user authorized to access the target account; a roles account object type, wherein a roles account object of the roles account object type configures privileges for accessing an account object, the privileges associated with a role of the user; a grant account object type, wherein a grant account object of the grant account object type configures a grant of at least one of the privileges for accessing the account object to at least another object; a warehouse object type, wherein a warehouse object of the warehouse object type indicates compute resources for executing a workload associated with one or more databases; and a resource monitor object type, wherein a resource monitor object of the resource monitor object type configures monitoring usage of the compute resources.

In Example 24, the subject matter of Example 23 includes subject matter where the at least first account object is the user account object, and the operations further comprising: determining the roles account object as the at least second account object based on the dependency.

In Example 25, the subject matter of Example 24 includes subject matter where the at least second account object further includes the grant account object, the grant account object further configures a grant of privileges associated with the role.

In Example 26, the subject matter of Examples 24-25 includes, the operations further comprising: performing the replication based on at least one secure credential associated with the user account object.

In Example 27, the subject matter of Examples 23-26 includes subject matter where the plurality of account object types further comprises: a database account object type, and wherein a database account object of the database account object type indicates the one or more databases; a share account object type, wherein a share account object of the share account object type configures sharing of the one or more databases from the source account to at least another account of the user; an integration account object type, wherein an integration account object of the integration account object type configures application programming interfaces (APIs) and allowed network access points for accessing the source account or the target account; and a network policy account object type, wherein a network policy object of the network policy account object type provides network configurations for accessing the source account and the target account of the user.

In Example 28, the subject matter of Example 27 includes subject matter where the replication request further includes the database account object and a list of at least one allowed database, the at least one allowed database being a subset of the one or more databases.

In Example 29, the subject matter of Example 28 includes, the operations further comprising: configuring the at least second account object to include the list of at least one allowed database; and performing a replication of the at least one allowed database from the source account into the target account of the data provider.

In Example 30, the subject matter of Examples 21-29 includes subject matter where the replication request further includes scheduling information, and the operations further comprising: performing the replication according to a replication schedule, the replication schedule configured based on the scheduling information.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   decoding, at a first computing node of a data provider, a replication request to obtain a data object;
   determining object dependencies between the data object and a plurality of additional data objects of the data provider, the object dependencies and the plurality of additional data objects maintained at the first computing node and associated with a primary deployment of the data provider, the primary deployment configured at a first geographic location;
   determining a replication sequence of the data object and the plurality of additional data objects based on the object dependencies;
   performing a replication of the data object and at least one of the plurality of additional data objects from the first computing node at the first geographic location to a second computing node of the data provider at a second geographic location according to the replication sequence; and
   generating at the first computing node, a notification of a successful completion of the replication from the first computing node to the second computing node.

2. The system of claim 1, wherein the instructions further cause the at least one hardware processor to perform operations comprising:
   retrieving the object dependencies using object dependency information maintained at a first account of the data provider configured at the first computing node.

3. The system of claim 2, wherein the instructions further cause the at least one hardware processor to perform operations comprising:
   performing the replication of the data object and the at least one of the plurality of additional data objects into a second account of the data provider configured at the second computing node.

4. The system of claim 3, wherein the instructions further cause the at least one hardware processor to perform operations comprising:
   determine the first account and the second account based on the replication request.

5. The system of claim 1, wherein the data object and the plurality of additional data objects are associated with a corresponding account object type of a plurality of account object types, and wherein the replication is performed from a first account at the first computing node into a second account at the second computing node of the data provider.

6. The system of claim 5, wherein the plurality of account object types comprises at least one of:
   a user account object type, wherein a user account object of the user account object type lists a user authorized to access the second account;
   a roles account object type, wherein a roles account object of the roles account object type configures privileges for accessing an account object, the privileges associated with a role of the user;
   a grant account object type, wherein a grant account object of the grant account object type configures a grant of at least one of the privileges for accessing the account object to at least another object;
   a warehouse object type, wherein a warehouse object of the warehouse object type indicates compute resources for executing a workload associated with one or more databases; and
   a resource monitor object type, wherein a resource monitor object of the resource monitor object type configures monitoring usage of the compute resources.

7. The system of claim 6, wherein the data object is the user account object, and wherein the instructions further cause the at least one hardware processor to perform operations comprising:
   determining the roles account object is one of the plurality of additional data objects based on the object dependencies.

8. The system of claim 6, wherein the plurality of account object types further comprises:
   a database account object type, and wherein a database account object of the database account object type indicates the one or more databases;
   a share account object type, wherein a share account object of the share account object type configures sharing of the one or more databases from the first account to at least another account of the user;
   an integration account object type, wherein an integration account object of the integration account object type configures application programming interfaces (APIs) and allowed network access points for accessing the first account or the second account; and
   a network policy account object type, wherein a network policy object of the network policy account object type provides network configurations for accessing the first account and the second account of the user.

9. The system of claim 8, wherein the replication request further includes the database account object and a list of at least one allowed database, the at least one allowed database being a subset of the one or more databases, and wherein the instructions further cause the at least one hardware processor to perform operations comprising:

configuring the plurality of additional data objects to include the list of at least one allowed database; and performing a replication of the at least one allowed database according to the replication sequence.

10. The system of claim 1, wherein the replication request further includes scheduling information, and wherein the instructions further cause the at least one hardware processor to perform operations comprising:

performing the replication of the data object and at least one of the plurality of additional data objects according to a replication schedule, the replication schedule configured based on the scheduling information.

11. A method comprising:

decoding, by at least one hardware processor of a first computing node of a data provider, a replication request to obtain a data object;

determining object dependencies between the data object and a plurality of additional data objects of the data provider, the object dependencies and the plurality of additional data objects maintained at the first computing node and associated with a primary deployment of the data provider, the primary deployment configured at a first geographic location;

determining a replication sequence of the data object and the plurality of additional data objects based on the object dependencies;

performing a replication of the data object and at least one of the plurality of additional data objects from the first computing node at the first geographic location to a second computing node of the data provider at a second geographic location according to the replication sequence; and generating at the first computing node, a notification of a successful completion of the replication from the first computing node to the second computing node.

12. The method of claim 11, further comprising:

retrieving the object dependencies using object dependency information maintained at a first account of the data provider configured at the first computing node.

13. The method of claim 12, further comprising:

performing the replication of the data object and the at least one of the plurality of additional data objects into a second account of the data provider configured at the second computing node.

14. The method of claim 13, further comprising:

determine the first account and the second account based on the replication request.

15. The method of claim 11, wherein the data object and the plurality of additional data objects are associated with a corresponding account object type of a plurality of account object types, and wherein the replication is performed from a first account at the first computing node into a second account at the second computing node of the data provider.

16. The method of claim 15, wherein the plurality of account object types comprises at least one of:

a user account object type, wherein a user account object of the user account object type lists a user authorized to access the second account;

a roles account object type, wherein a roles account object of the roles account object type configures privileges for accessing an account object, the privileges associated with a role of the user;

a grant account object type, wherein a grant account object of the grant account object type configures a grant of at least one of the privileges for accessing the account object to at least another object;

a warehouse object type, wherein a warehouse object of the warehouse object type indicates compute resources for executing a workload associated with one or more databases; and a resource monitor object type, wherein a resource monitor object of the resource monitor object type configures monitoring usage of the compute resources.

17. The method of claim 16, wherein the data object is the user account object, and wherein the method further comprises:

determining the roles account object is one of the plurality of additional data objects based on the object dependencies.

18. The method of claim 16, wherein the plurality of account object types further comprises:

a database account object type, and wherein a database account object of the database account object type indicates the one or more databases;

a share account object type, wherein a share account object of the share account object type configures sharing of the one or more databases from the first account to at least another account of the user;

an integration account object type, wherein an integration account object of the integration account object type configures application programming interfaces (APIs) and allowed network access points for accessing the first account or the second account; and a network policy account object type, wherein a network policy object of the network policy account object type provides network configurations for accessing the first account and the second account of the user.

19. The method of claim 18, wherein the replication request further includes the database account object and a list of at least one allowed database, the at least one allowed database being a subset of the one or more databases, and wherein the method further comprises:

configuring the plurality of additional data objects to include the list of at least one allowed database; and performing a replication of the at least one allowed database according to the replication sequence.

20. The method of claim 11, wherein the replication request further includes scheduling information, and wherein the method further comprises:

performing the replication of the data object and at least one of the plurality of additional data objects according to a replication schedule, the replication schedule configured based on the scheduling information.

21. A computer-storage medium comprising instructions that, when executed by one or more processors of a machine, configure the machine to perform operations comprising:

decoding, at a first computing node of a data provider, a replication request to obtain a data object;

determining object dependencies between the data object and a plurality of additional data objects of the data provider, the object dependencies and the plurality of additional data objects maintained at the first computing node and associated with a primary deployment of the data provider, the primary deployment configured at a first geographic location;

determining a replication sequence of the data object and the plurality of additional data objects based on the object dependencies;

performing a replication of the data object and at least one of the plurality of additional data objects from the first computing node at the first geographic location to a second computing node of the data provider at a second geographic location according to the replication sequence; and generating at the first computing node, a notification of a successful completion of the replication from the first computing node to the second computing node.

22. The computer-storage medium of claim 21, the operations further comprising:

retrieving the object dependencies using object dependency information maintained at a first account of the data provider configured at the first computing node.

23. The computer-storage medium of claim 22, the operations further comprising:

performing the replication of the data object and the at least one of the plurality of additional data objects into a second account of the data provider configured at the second computing node.

24. The computer-storage medium of claim 23, the operations further comprising:

determine the first account and the second account based on the replication request.

25. The computer-storage medium of claim 21, wherein the data object and the plurality of additional data objects are associated with a corresponding account object type of a plurality of account object types, and wherein the replication is performed from a first account at the first computing node into a second account at the second computing node of the data provider.

26. The computer-storage medium of claim 25, wherein the plurality of account object types comprises at least one of:

a user account object type, wherein a user account object of the user account object type lists a user authorized to access the second account;

a roles account object type, wherein a roles account object of the roles account object type configures privileges for accessing an account object, the privileges associated with a role of the user;

a grant account object type, wherein a grant account object of the grant account object type configures a grant of at least one of the privileges for accessing the account object to at least another object;

a warehouse object type, wherein a warehouse object of the warehouse object type indicates compute resources for executing a workload associated with one or more databases; and a resource monitor object type, wherein a resource monitor object of the resource monitor object type configures monitoring usage of the compute resources.

27. The computer-storage medium of claim 26, wherein the data object is the user account object, and wherein the operations further comprise:

determining the roles account object is one of the plurality of additional data objects based on the object dependencies.

28. The computer-storage medium of claim 26, wherein the plurality of account object types further comprises:

a database account object type, and wherein a database account object of the database account object type indicates the one or more databases;

a share account object type, wherein a share account object of the share account object type configures sharing of the one or more databases from the first account to at least another account of the user;

an integration account object type, wherein an integration account object of the integration account object type configures application programming interfaces (APIs) and allowed network access points for accessing the first account or the second account; and a network policy account object type, wherein a network policy object of the network policy account object type provides network configurations for accessing the first account and the second account of the user.

29. The computer-storage medium of claim 28, wherein the replication request further includes the database account object and a list of at least one allowed database, the at least one allowed database being a subset of the one or more databases, and wherein the operations further comprise:

configuring the plurality of additional data objects to include the list of at least one allowed database; and performing a replication of the at least one allowed database according to the replication sequence.

30. The computer-storage medium of claim 21, wherein the replication request further includes scheduling information, and wherein the operations further comprise:

performing the replication of the data object and at least one of the plurality of additional data objects according to a replication schedule, the replication schedule configured based on the scheduling information.

\* \* \* \* \*